(12) United States Patent
Adamson et al.

(10) Patent No.: US 10,745,114 B2
(45) Date of Patent: Aug. 18, 2020

(54) DRAG REDUCTION DEVICE FOR EXPOSED LANDING GEAR CAVITIES

(71) Applicant: The Boeing Company, Chicago, IL (US)

(72) Inventors: Eric E. Adamson, Newcastle, WA (US); David A. Treiber, Seattle, WA (US)

(73) Assignee: The Boeing Company, Chicago, IL (US)

( * ) Notice: Subject to any disclaimer, the term of this patent is extended or adjusted under 35 U.S.C. 154(b) by 568 days.

(21) Appl. No.: 15/670,566

(22) Filed: Aug. 7, 2017

(65) Prior Publication Data

US 2019/0039722 A1  Feb. 7, 2019

(51) Int. Cl.
  *B64C 25/16* (2006.01)
  *B64C 25/00* (2006.01)
  *B64C 25/12* (2006.01)

(52) U.S. Cl.
  CPC ............ *B64C 25/16* (2013.01); *B64C 25/001* (2013.01); *B64C 25/12* (2013.01); *B64C 2025/003* (2013.01); *B64C 2025/125* (2013.01)

(58) Field of Classification Search
  CPC . B64C 25/16; B64C 25/001; B64C 2025/003; B64C 25/12; B64C 2025/125; B64C 25/10
  See application file for complete search history.

(56) References Cited

U.S. PATENT DOCUMENTS 2,921,759 A * 1/1960 Elkin ...................... B64C 25/12
                                                    244/102 R
2004/0104301 A1* 6/2004 Wickerhoff ............... B64C 7/00
                                                      244/10
2012/0153078 A1* 6/2012 Loupias ................. B64C 1/068
                                                    244/102 R
2015/0001342 A1* 1/2015 Takenaka ................ B64C 25/12
                                                    244/119
2016/0185451 A1* 6/2016 Bellet ....................... B64C 1/18
                                                    244/133
2016/0200423 A1* 7/2016 Cook ...................... B64C 25/34
                                                    244/102 R
2017/0166300 A1* 6/2017 Cros ....................... B64C 25/16

OTHER PUBLICATIONS

Search Report for related European Application No. EP18183672; dated Jan. 7, 2019.

* cited by examiner

*Primary Examiner* — Assres H Woldemaryam
(74) *Attorney, Agent, or Firm* — Miller, Matthias & Hull LLP (57) ABSTRACT

An exposed main landing gear cavity in a bottom wall of an aircraft fuselage may include a main landing gear cavity outer ring recessed within the fuselage and having an inner surface encircling the main landing gear cavity, first baffle extending inward from the outer ring inner surface at an aft and inboard position on the inner surface, and a second baffle extending inward from the outer ring inner surface at an aft and outboard position on the outer ring inner surface. The main landing gear cavity may further include an aft fairing disposed proximate the outer ring bottom edge of the outer ring and connected to the fuselage at an aft side of the main landing gear cavity. An aft fairing top surface may have curvature causing the top surface to extend downward away from the outer ring as the top surface extends inward away from the outer ring.

27 Claims, 5 Drawing Sheets

DRAG REDUCTION DEVICE FOR EXPOSED LANDING GEAR CAVITIES

TECHNICAL FIELD

The present disclosure relates generally to aircraft landing gear and, more particularly, to drag reduction for aircraft landing gear stowed in exposed landing gear cavities during flight.

BACKGROUND

Aircraft have main landing gear to support the aircraft during takeoff and landing, and while the aircraft is sitting and taxiing on the ground. During flight, the landing gear are not needed for support, and can cause drag that can reduce the efficiency of the aircraft. For aircraft that travel long distances or require high fuel efficiency and maneuverability, the landing gear are retracted into the fuselage and/or the wings during flight to improve the aerodynamic characteristics of the aircraft. To reduce weight, cost and complexity, while the landing gear may be retracted during flight, some aircraft do not have a complete main landing gear door to fully cover the landing gear on the underside of the fuselage when the aircraft is in flight. The absence of a complete main landing gear door results in a cavity around the landing gear and an aerodynamic discontinuity that exposes the cavity to the airstream and creates noise and drag that are undesirable and can still reduce the efficiency of the aircraft.

SUMMARY OF THE DISCLOSURE

In one aspect of the present disclosure, a main landing gear cavity in a bottom wall of a fuselage of an aircraft is disclosed. The main landing gear cavity may include a main landing gear cavity outer ring having an outer ring inner surface encircling the main landing gear cavity and being recessed within the fuselage from the bottom wall, a first baffle extending inward from the outer ring inner surface at a first baffle position that is aft and inboard on the outer ring inner surface, and a second baffle extending inward from the outer ring inner surface at a second baffle position that is aft and outboard on the outer ring inner surface.

In another aspect of the present disclosure, a main landing gear cavity in a bottom wall of a fuselage of an aircraft is disclosed. The main landing gear cavity may include a main landing gear cavity outer ring recessed within the fuselage from the bottom wall, the main landing gear cavity outer ring having an outer ring inner surface encircling the main landing gear cavity, an outer ring top edge and an outer ring bottom edge disposed opposite the outer ring top edge, and an aft fairing disposed proximate the outer ring bottom edge of the main landing gear cavity outer ring and connected to the bottom wall of the fuselage at an aft side of the main landing gear cavity, the aft fairing having an aft fairing top surface with a top surface curvature causing the aft fairing top surface to extend downward away from the main landing gear cavity outer ring as the aft fairing top surface extends inward away from the main landing gear cavity outer ring.

In a further aspect of the present disclosure, a main landing gear cavity in a bottom wall of a fuselage of an aircraft is disclosed. The main landing gear cavity may include a main landing gear cavity outer ring recessed within the fuselage from the bottom wall, the main landing gear cavity outer ring having an outer ring inner surface encircling the main landing gear cavity, an outer ring top edge and an outer ring bottom edge disposed opposite the outer ring top edge, and an aft fairing disposed proximate the outer ring bottom edge of the main landing gear cavity outer ring and connected to the bottom wall of the fuselage at an aft side of the main landing gear cavity, the aft fairing having an aft fairing top surface with a top surface curvature causing the aft fairing top surface to extend downward away from the main landing gear cavity outer ring as the aft fairing top surface extends inward away from the main landing gear cavity outer ring. The main landing gear cavity may further include an inboard baffle extending inward from the outer ring inner surface at a first baffle position that is aft and inboard on the outer ring inner surface, and an outboard baffle extending inward from the outer ring inner surface at a second baffle position that is aft and outboard on the outer ring inner surface, wherein the inboard baffle and the outboard baffle are disposed above the aft fairing. The main landing gear cavity may also include a blade seal disposed proximate the outer ring top edge of the main landing gear cavity outer ring and extending inward such that a plurality of blades of the blade seal engage a tire tread of a main landing gear tire when a main landing gear of the aircraft is retracted into the main landing gear cavity.

In a still further aspect of the present disclosure, a method for reducing drag on an aircraft is disclosed. The method for reducing drag may include retracting main landing gear of the aircraft into a main landing gear cavity in a bottom wall of a fuselage of the aircraft during flight, exposing the main landing gear and the main landing gear cavity to airflow over the fuselage of the aircraft during flight, and inhibiting unconstrained airflow circulating within the main landing gear cavity aft of the main landing gear when the landing gear is retracted with a plurality of baffles on an aft side of the main landing gear cavity.

Additional aspects are defined by the claims of this patent.

DETAILED DESCRIPTION

Figure 1:
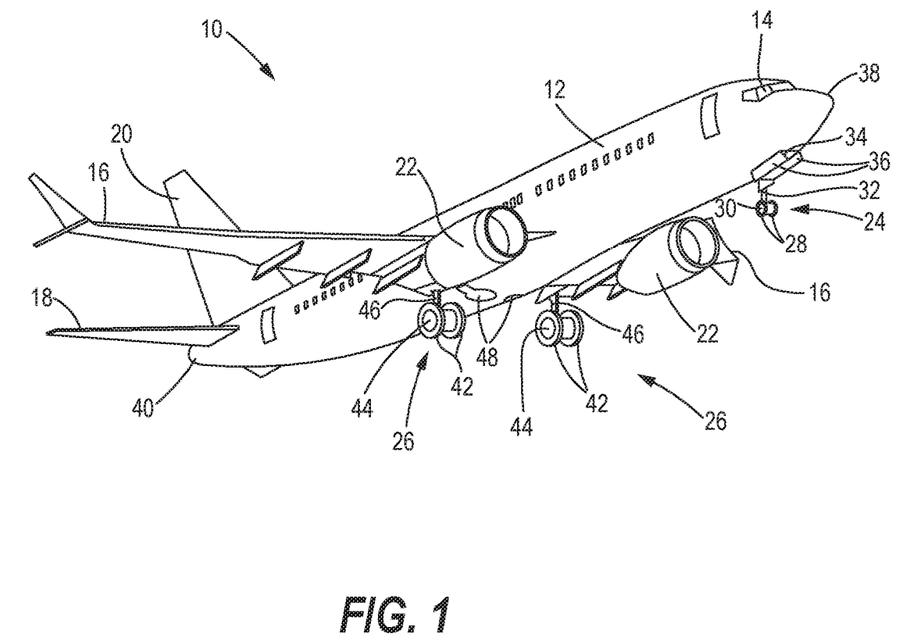
FIG. 1 is a bottom starboard perspective view of an aircraft during takeoff and with main landing gear extended.

FIG. 1 is a perspective view of an exemplary aircraft 10 from a bottom starboard angle shortly after takeoff. The exemplary aircraft 10 includes a fuselage 12, a cockpit 14, a pair of wings 16, a pair of horizontal stabilizers 18 (portside horizontal stabilizer 18 hidden in this view), a vertical stabilizer 20, and a pair of engines 22. Because the aircraft 10 has just taken off, front landing gear 24 and main landing gear 26 are still deployed from bottoms of the fuselage 12 and the wings 16. The front landing gear 24 includes front landing gear tires 28 mounted on front landing gear hubs 30 and suspended from the fuselage 12 by a front landing gear strut 32. The fuselage 12 includes a front landing gear cavity 34 into which the front landing gear 24 are retracted after takeoff, after which front landing gear doors 36 close so the front landing gear cavity 34 is not exposed to the airstream flowing over the fuselage 12 from a nose 38 at the forward end to a tail 40 at the aft end during flight.

Figure 2:
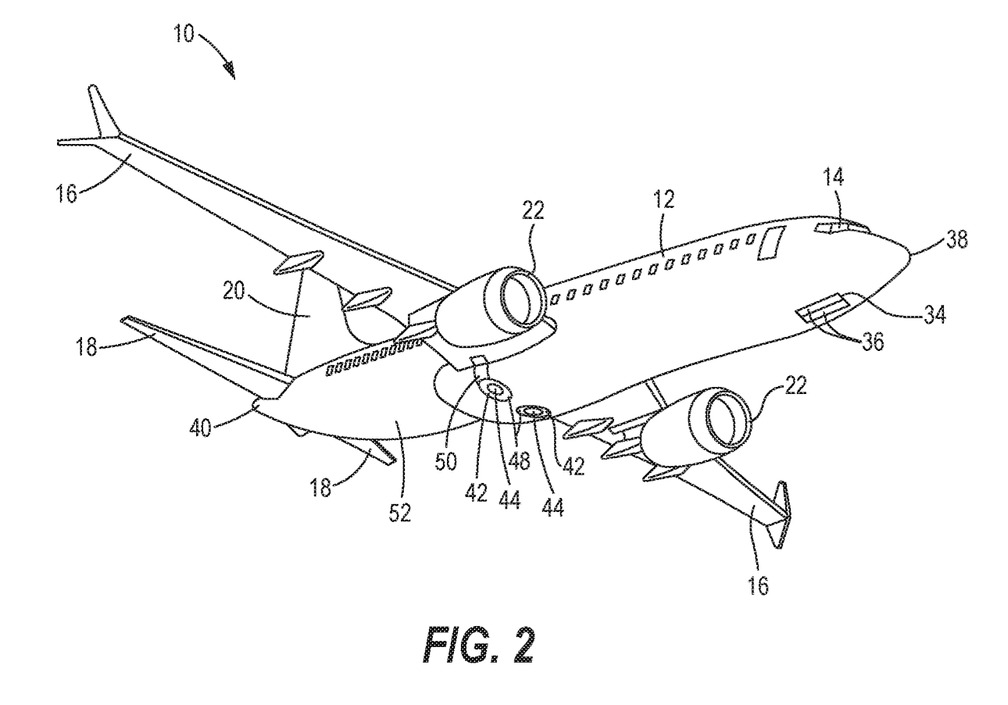
FIG. 2 is a bottom starboard perspective view of the aircraft of FIG. 1 with main landing gear retracted into exposed landing gear cavities in a fuselage bottom wall of a fuselage of the aircraft.

The main landing gear 26 in the illustrated aircraft 10 are positioned proximate the wings 16 and are suspended from the wings 16. The main landing gear 26 include main landing gear tires 42 mounted on main landing gear hubs 44 and suspended from the wings 16 by main landing gear struts 46. After takeoff, the main landing gear 26 are rotated inward and stowed in exposed main landing gear cavities 48 in the fuselage bottom wall of the fuselage 12. Main landing gear doors 50 (FIG. 2) are mounted on the main landing gear struts 46 and partially cover the main landing gear cavities 48 in the areas of the wings 16 and the fuselage 12 through which the main landing gear struts 46 pass. However, the main landing gear doors 50 do not complete close the exposed main landing gear cavities 48 and do not completely enclose the main landing gear 26 as shown in FIG. 2.

Figure 3:
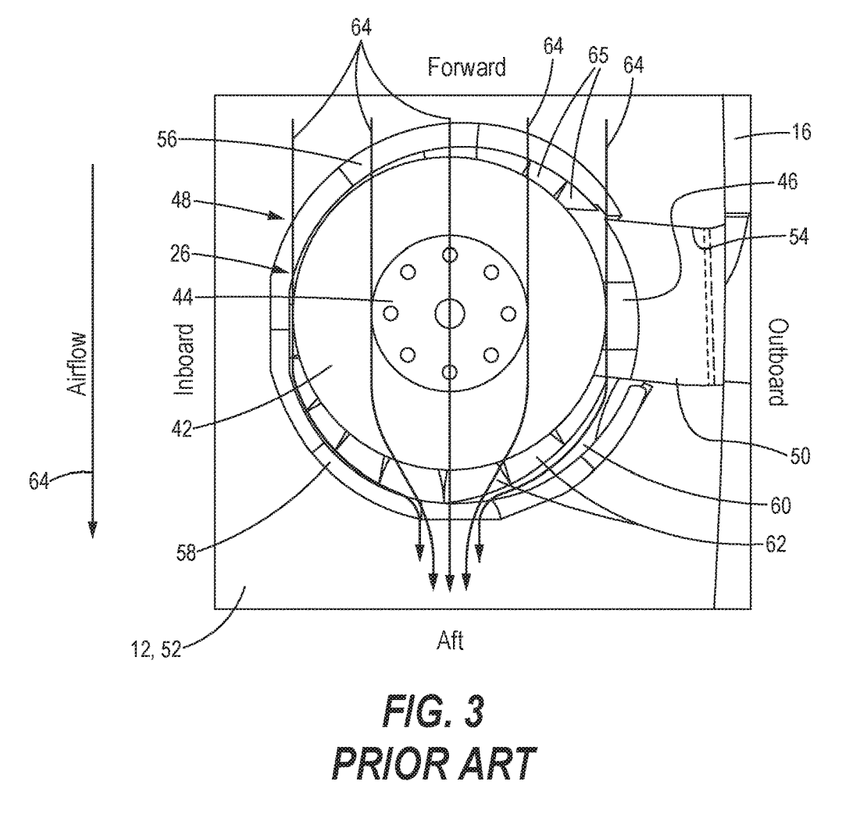
FIG. 3 is a bottom view of a portion of the fuselage bottom wall of the aircraft of FIG. 1 including a previously-known exposed landing gear cavity having the main landing gear retracted therein.

FIG. 3 illustrates a bottom view of a portion of a fuselage bottom wall 52 of the fuselage 12 in the area of one of the main landing gear cavities 48 as currently known. As shown, a forward direction of the aircraft 10 is toward the top of the figure, and an aft direction is toward the bottom. An outboard side of the aircraft 10 and the corresponding wing 16 are to the right in FIG. 3, and an inboard side is on the left. The main landing gear cavity 48 is shown with the corresponding main landing gear 26 retracted and the main landing gear tires 42 disposed within the main landing gear cavity 48. The main landing gear door 50 covers a main landing gear door gap 54 in the fuselage bottom wall 52 when the main landing gear 26 are retracted.

Noise and drag at the main landing gear cavity 48 may be reduced by mounting a forward fairing 56 on a forward side of the main landing gear cavity 48, and an aft fairing 58 on an aft side of the main landing gear cavity 48. The forward fairing 56 and the aft fairing 58 combine to encircle the main landing gear cavity 48 with the exception of the main landing gear door gap 54 so that the main landing gear 26 can be retracted into the main landing gear cavity 48. Bottom surfaces of the forward fairing 56 and the aft fairing 58 are curved or rounded to reduce turbulence as airflows over the fairings 56, 58, and into and out of the main landing gear cavity 48. A blade seal 60 is mounted within the main landing gear cavity 48 and has a plurality of blades 62 extending inward and circumferentially spaced around the main landing gear cavity 48. When the main landing gear 26 are retracted, the blades 62 engage the outer wall and/or the treads of the main landing gear tire 42 to minimize airflow into the fuselage 12 through the main landing gear cavity 48.

During flight, air flows past the forward fairing 56 and over the main landing gear tire 42, and into the main landing gear cavity 48 as indicated by arrows 64. Due to the curvatures of the main landing gear 26 and the main landing gear cavity 48, the airflow will converge and accumulate at a location on the aft side of the main landing gear cavity 48 before flowing over the aft fairing 58 and out of the main landing gear cavity 48. As illustrated, the convergence point of the airflows is at a central location on the aft side, but the convergence point may be shifted to either the inboard side or the outboard side of the main landing gear cavity 48 depending on the aerodynamic characteristics of the main landing gear cavity 48.

Figure 4:
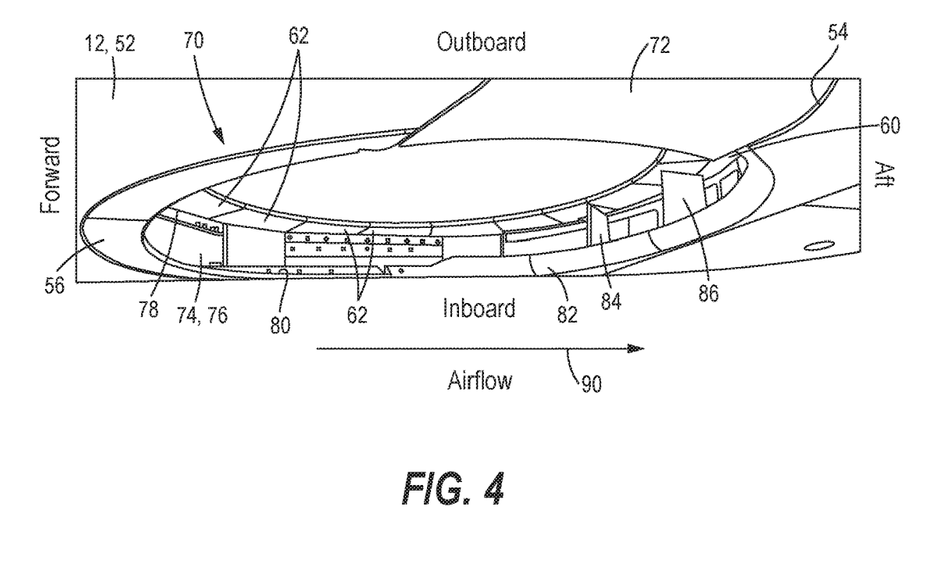
FIG. 4 is a bottom outboard side view of a portion of the fuselage bottom wall of the aircraft of FIG. 1 including an exposed main landing gear cavity in accordance with the present disclosure with a main landing gear cavity door closed and the main landing gear omitted for clarity of illustration.

FIGS. 4-7 illustrate an exposed main landing gear cavity 70 in accordance with the present disclosure that may distribute the airflow at an aft end of the main landing gear cavity 70 and reduce noise and drag caused by the discontinuity in the fuselage bottom wall 52 of the fuselage 12. Referring to FIG. 4, the main landing gear cavity 70 may have a generally similar configuration as the main landing gear cavity 48, and similar components are identified using the same reference numerals. In FIG. 4, a main landing gear door 72 is shown in a closed position and received within the main landing gear door gap 54. The main landing gear tire 42 and the main landing gear hub 44 are omitted from FIG. 4 for clarity of illustration of the internal components of the main landing gear cavity 70. In FIG. 4, the forward direction is on the left, the aft direction is on the right, the outboard side is toward the top and the inboard side is toward the bottom.

The main landing gear cavity 70 includes a main landing gear cavity outer ring 74 that is recessed into the fuselage 12 from the fuselage bottom wall 52. The main landing gear cavity outer ring 74 has an outer ring inner surface 76 that encircles the main landing gear cavity 70 with the exception of the main landing gear door gap 54. The blade seal 60 is mounted proximate an outer ring top edge 78, with the blades 62 extending inward into, and circumferentially spaced about, the main landing gear cavity 70 to engage the sidewalls and treads of the main landing gear tire 42 when the main landing gear 26 is retracted into the main landing gear cavity 70 (See, e.g., FIGS. 6 and 7).

As further illustrated in FIG. 4, the forward fairing 56 is mounted to the fuselage bottom wall 52 on the forward side of the main landing gear cavity 70. The forward fairing 56 is disposed proximate an outer ring bottom edge 80 of the main landing gear cavity outer ring 74. An aft fairing 82 is mounted on the aft side of the main landing gear cavity 70 in a similar manner as the aft fairing 58 illustrated and described above, and is also dispose proximate the outer ring bottom edge 80. The aft fairing 82 and the forward fairing 56 combine to encircle the main landing gear cavity 70 with the exception of the main landing gear door gap 54. The aft fairing 82 is configured to reduce the drag caused by the main landing gear cavity 70, and details of the design of the aft facing 82 are illustrated and described further below.

The airflow through the main landing gear cavity 70 may be further controlled to reduce drag by baffles within the main landing gear cavity 70. As shown in FIG. 4, the main landing gear cavity 70 may have a first or inboard baffle 84 and a second or outboard baffle 86 mounted on the aft side of the main landing gear cavity 70. The baffles 84, 86 may be oriented generally vertically and extend inward from the outer ring inner surface 76 into the main landing gear cavity 70.

Figure 5:
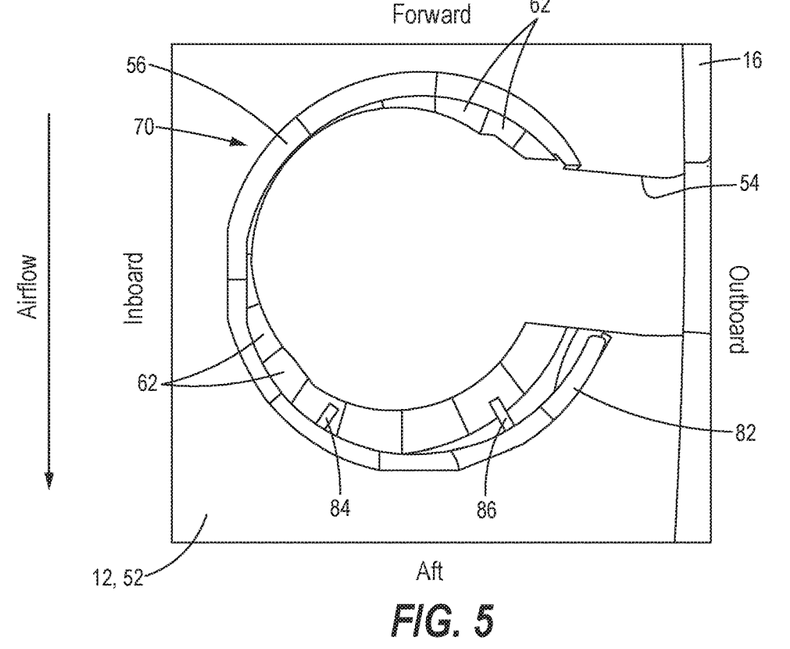
FIG. 5 is a bottom view of the portion of the fuselage bottom wall of the aircraft including the exposed main landing gear cavity of FIG. 4 when the main landing gear is extended.

FIG. 5 illustrates a bottom view of the portion of the fuselage bottom wall 52 proximate the main landing gear cavity 70. The main landing gear 26 is in the extended position and other components within the fuselage 12 are not shown for clarity of illustration of the main landing gear cavity 70 and its components. The inboard baffle 84 and the outboard baffle 86 extend inward from the aft side of the outer ring inner surface 76 into the main landing gear cavity 70. The inboard baffle 84 extends from a first or aft baffle position of the outer ring inner surface 76 (hidden by fairings 56, 82 in FIG. 5) that is on an inboard side of the main landing gear cavity outer ring 74, and the outboard baffle 86 extends from a second or outboard baffle position on an outboard side of the main landing gear cavity outer ring 74. In the illustrated embodiment, the inboard baffle 84 extends forward from the outer ring inner surface 76, and also extends toward the outboard side as it extends forward. Similarly, the outboard baffle 86 extends forward from the outer ring inner surface 76, and also extends toward the inboard side as it extends forward. In one embodiment, the main landing gear cavity outer ring 74 and the outer ring inner surface 76 are circular, and the inboard baffle 84 and the outboard baffle 86 extend radially inward toward the center of the main landing gear cavity outer ring 74. In another alternative embodiment, the inboard baffle 84 and the outboard baffle 86 may extend straight forward without also being oriented toward the inboard or outboard sides of the main landing gear cavity 70. Of course, other orientations of the inboard baffle 84 and the outboard baffle 86 are contemplated by the inventors to achieve desired air flow through and out of the main landing gear cavity 70 during flight as described further below, as well as to balance other factors such as complexity, weight, maintenance and cost.

Figure 6:
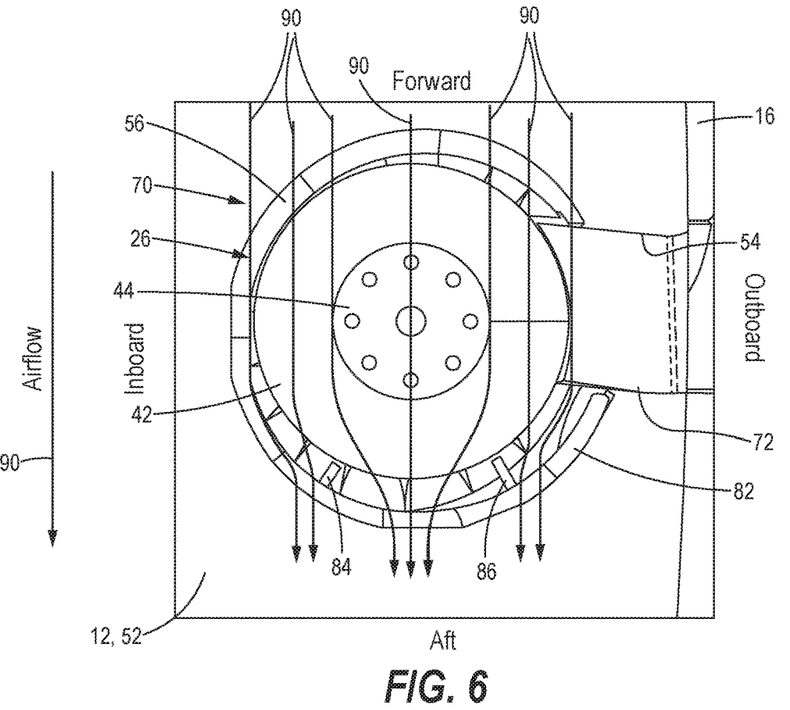
FIG. 6 is the bottom view of the portion of the fuselage bottom wall of FIG. 5 with the main landing gear retracted into the exposed main landing gear cavity.

FIG. 6 illustrates the main landing gear cavity 70 with the main landing gear 26 retracted into the main landing gear cavity 70. As the main landing gear 26 are retracted and the main landing gear tire 42 enters the main landing gear cavity 70, the blades 62 of the blade seal 60 engage the side wall and the treads of the main landing gear tire 42. The blade seal 60 may be formed from a resilient material that allows the blades 62 to deflect while maintaining contact with the main landing gear tire 42 to prevent most of the air flow from passing into the fuselage 12. It should also be noted that the main landing gear door 72 in accordance with the present disclosure has a cantilevered extension farther into the main landing gear cavity 70 to reduce the discontinuity in the fuselage bottom wall 52 in comparison to the previous main landing gear door 36 shown in FIG. 3.

It is also apparent from FIG. 6 that the inboard baffle 84 and the outboard baffle 86 do not engage the main landing gear tire 42. This allows the main landing gear 26 to be extended and retracted without being engaged by the baffles 84, 86 and potentially being damaged. Consequently, some airflow may occur between the main landing gear tire 42 and the inward ends of the baffles 84, 86. However, in alternative embodiments, the baffles 84, 86 may be fabricated from a resilient or other type of material that would allow the baffles 84, 86 to extend to and engage the main landing gear tire 42 without causing damage while preventing air flow there between.

Similar to the main landing gear cavity 48 of FIG. 3, during flight, air flows past the forward fairing 56 and over the main landing gear tire 42, and into the main landing gear cavity 70 as indicated by arrows 90. In contrast, however, the inboard baffle 84 and the outboard baffle 86 prevent the airflow from converging and accumulating at one location on the aft side of the main landing gear cavity 70 before flowing over the aft fairing 82. In general, most of the airflow on the inboard side of the inboard baffle 84 converges at the inboard baffle 84 and flows out of the main landing gear cavity 70 on the inboard side of the inboard baffle 84. At the same time, most of the airflow on the outboard side of the outboard baffle 86 converges at the outboard baffle 86 and flows out of the main landing gear cavity 70 on the outboard side of the outboard baffle 86. The remaining airflow over the main landing gear tire 42 and between the baffles 84, 86 will flow out of the main landing gear cavity 70 over the aft fairing 82 between the baffles 84, 86. The distribution of the air flow across the aft end of the main landing gear cavity 70 and the aft fairing 82 can result in a significant reduction in drag caused by the main landing gear cavity 70 over the prior main landing gear cavity 48 without baffles as discussed further below.

Figure 7:
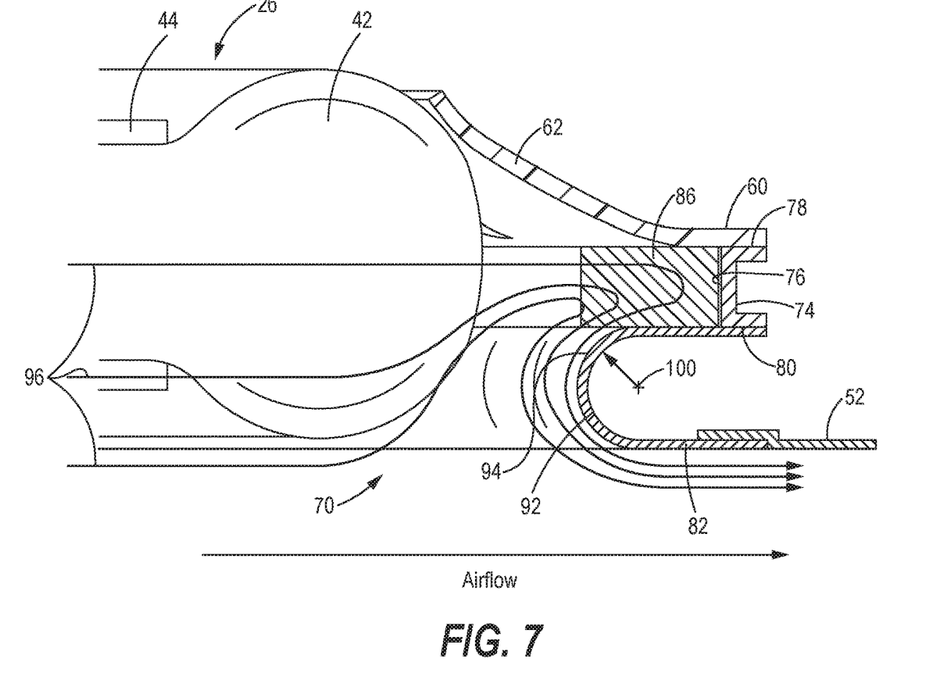
FIG. 7 is a cross-sectional view of the portion of the fuselage bottom wall of FIG. 5 taken through line 7-7 of FIG. 6.

FIG. 7 is a cross-sectional view of a portion of the main landing gear cavity 70 taken through the outboard baffle 86. The outboard baffle 86, as well as the inboard baffle 84, may be connected to the outer ring inner surface 76, the aft fairing 82, or both. The baffles 84, 86 are generally disposed between the blade seal 60 and the aft fairing 82, and may extend further into the main landing gear cavity 70 than the aft fairing 82 if necessary to achieve a desired airflow pattern. FIG. 7 also illustrates the blades 62 of the blade seal 60 being deflected while engaging the main landing gear tire 42 of the retracted main landing gear 26.

The aft fairing 82 as shown is connected to the fuselage bottom wall 52 at the aft side of the main landing gear cavity 70 and proximate the outer ring bottom edge 80 of the main landing gear cavity outer ring 74. The aft fairing 82 includes an aft fairing bottom surface 92 with a bottom curvature causing the aft fairing bottom surface 92 to extend upward toward the main landing gear cavity outer ring 74 as the aft fairing bottom surface 92 extends inward and away from the main landing gear cavity outer ring 74. In previous aft fairings, an upper surface is absent. In contrast, the aft fairing 82 in accordance with the present disclosure has an aft fairing top surface 94 with a top fairing curvature causing the aft fairing top surface 94 to extend downward away from the main landing gear cavity outer ring 74 as the aft fairing top surface 94 extends inward and away from the main landing gear cavity outer ring 74.

The aft fairing top surface 94 intersects the aft fairing bottom surface 92 to form a continuous curved surface from the interior to the exterior of the main landing gear cavity 70. The curved surface provides a smooth path for air flowing through the main landing gear cavity 70 as indicated by arrows 96. Airflows into the main landing gear cavity 70 over or around the main landing gear tire 42 can collect at the outer ring inner surface 76 between the blade seal 60 and the aft fairing 82. Further incoming airflow forces air out of the main landing gear cavity 70 and over the aft fairing 82. The air flows across the smooth surface created by the aft fairing top surface 94 and the aft fairing bottom surface 92, and back into the main airflow over the fuselage bottom wall 52.

Figure 8:
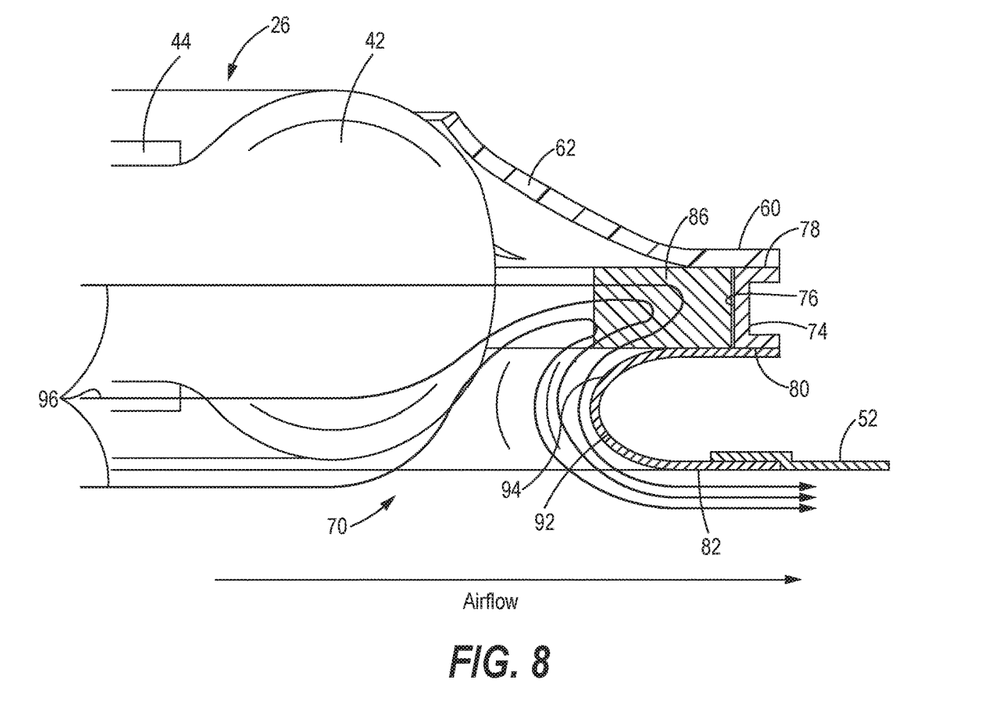
FIG. 8 is a cross-sectional view of FIG. 7 with an alternative embodiment of an aft fairing in accordance with the present disclosure.

As shown in FIG. 7, the aft fairing bottom surface 92 and the aft fairing top surface 94 have a common radius of curvature 100 defining the bottom surface curvature and the top surface curvature. Consequently, the surfaces 92, 94 form a semi-circular path over which air will flow. Other continuous curved surfaces are contemplated. For example, FIG. 8 illustrates the same cross-sectional view where the aft fairing bottom surface 92 and the aft fairing top surface 94 have elliptical shapes that may be symmetrical about a horizontal plane passing through the aft fairing 80. In further alternative embodiments, the aft fairing bottom surface 92 and the aft fairing top surface 94 may have curvatures that are not symmetrical while still providing a continuous curved surface for airflow. For example, the aft fairing top surface 94 may be semicircular with a constant radius of curvature while the aft fairing bottom surface 92 may be semi-elliptical or semi-parabolic. Other configurations are contemplated that may be required to meet requirements for a particular aircraft 10.

INDUSTRIAL APPLICABILITY

Figure 9:
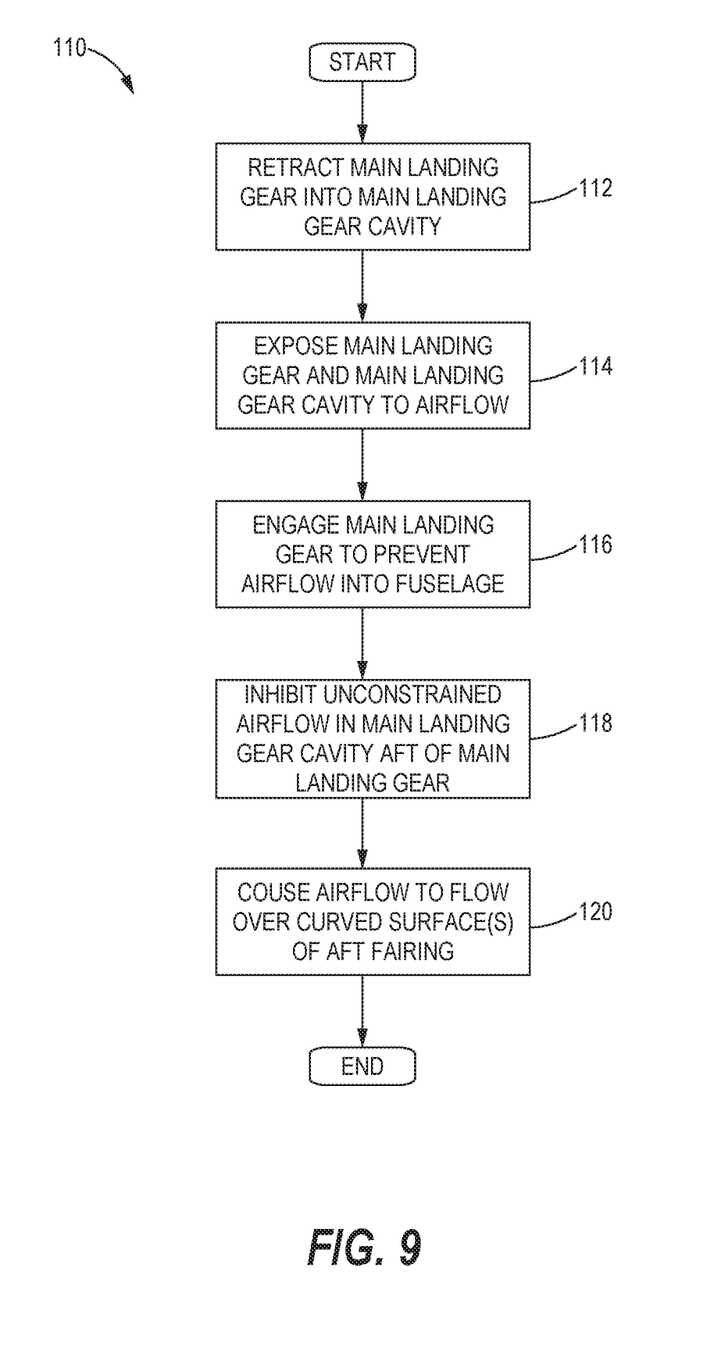
FIG. 9 is a flow diagram of a drag reduction routine for reducing the overall drag on the aircraft of FIG. 1 during flight.

FIG. 9 illustrates a drag reduction routine 110 wherein the exposed main landing gear cavity 70 is used to reduce the overall drag on the aircraft 10 during flight. The drag reduction routine 110 may begin at a block 112 where the main landing gear 26 of the aircraft 10 are retracted into the main landing gear cavity 70 within the bottom wall 52 of the fuselage 12. After the main landing gear 26 are retracted into the main landing gear cavity 70, the main landing gear 26 and the main landing gear cavity 70 remain exposed to the airflow 90 over the fuselage 12 during flight at a block 114 because the main landing gear door 72 does not completely cover and enclose the main landing gear cavity 70. A portion of the airflow 90 enters the main landing gear cavity 70 and circulates therein around the main landing gear 26. As the main landing gear 26 are retracted, the blades 62 of the blade seal 60 engage the outer wall and/or the treads of the main landing gear tire 42 of the main landing gear 26 at a block 116. The engagement of the main landing gear 26 will reduce or prevent the airflow circulating within the main landing gear cavity 70 from passing into the fuselage 12 through the main landing gear cavity 70.

In the previous main landing gear cavity 48 of FIG. 3, unconstrained airflow circulates within the main landing gear cavity 48 aft of the main landing gear 26. The unconstrained airflow ultimately flows out of the main landing gear cavity 48 at a concentrated location, thereby creating the large-profile wake behind the main landing gear cavity 48 that adds a large drag increment. In contrast, the main landing gear cavity 70 with the baffles 84, 86 in accordance with the present disclosure inhibits unconstrained airflow circulating with the main landing gear cavity 70 aft of the main landing gear 26 at a block 118 of the routine 110 of FIG. 9. With the inboard baffle 84 extending inward from main landing gear cavity outer ring 74 at the aft and inboard position and the outboard baffle 86 extending inward from the main landing gear cavity outer ring 74 at the aft and outboard position, a first portion of the airflow circulating within the main landing gear cavity 70 flows out of the main landing gear cavity 70 on an inboard side of the inboard baffle 84 as shown in FIG. 6, a second portion of the airflow flows out of the main landing gear cavity 70 on an outboard side of the outboard baffle 86, and a third portion of the airflow flows out of the main landing gear cavity 70 between the inboard baffle 84 and the outboard baffle 86. This arrangement smoothes the spillage of the airflow out of the main landing gear cavity 70 and reduces the wake behind the main landing gear cavity 70. Those skilled in the art will understand that additional baffles may be installed on the aft side of the main landing gear cavity 70 to further distribute and smooth the airflow out of the main landing gear cavity 70. Moreover, alternative flow control structures may be provided within the main landing gear cavity 70 to inhibit unconstrained airflow on the aft side of the main landing gear cavity 70. Additionally, the configurations of the main landing gear cavity 70 and the aft fairing 82 cause the airflow circulating within the main landing gear cavity 70 aft of the main landing gear 26 to flow over the aft fairing top surface 92 and/or the aft fairing bottom surface 94 and out of the main landing gear cavity 70 at a block 120. The smooth curved aft fairing surfaces 92, 94 further reduce the turbulence at the aft end of the main landing gear cavity 70 during flight and thereby reduce the drag on the aircraft 10 added by the exposed main landing gear cavities 70.

The inboard baffle 84 and the outboard baffle 86 in accordance with the present disclosure redistribute the spill airflow that comes into the main landing gear cavity 70 on two sides of the main landing gear cavity 70 instead of allowing flow migration from one side to the other and having the spill airflow concentrated in one location as occurs in the previously-known main landing gear cavity 48. Allowing airflow to migrate from the inboard and/or outboard sides to a concentrated location where all airflow spillage occurs presents a large-profile wake behind the main landing gear cavity 48 that adds a large drag increment to the overall drag of the aircraft 10. Airflow simulations performed on large commercial aircraft 10 determine that the exposed main landing gear cavities 48 without baffles contribute in the range of 0.75% to 0.90% to the overall drag experienced by the aircraft 10. The arrangement with the baffles 84, 86 in contrast provides less excrescence drag on the aircraft 10 and smoothes spillage of the airflow over the aft fairing 82 with a lower-profile wake behind the main landing gear cavity 70. Similar airflow simulations with the large commercial aircraft 10 having the exposed main landing gear cavities 70 with the baffles 84, 86 as illustrated and described herein determine the that main landing gear cavities 70 contribute approximately 0.33% to the overall drag experienced by the aircraft 10, or approximately 56% to 74% less drag than is added by the previous main landing gear cavities 48. While two baffles 84, 86 are implemented in the illustrated embodiment, those skilled in the art will understand that additional baffles can be implemented to further control the distribution of the spill airflow across the aft end of the main landing gear cavity 70, and such alternatives are contemplated.

Smooth airflow over the aft fairing 82 and out of the main landing gear cavity 70 is further promoted by the curvature of the aft fairing top surface 94. The curved aft fairing top surface 94 allows the airflow to exit the main landing gear cavity 70 over a surface that more closely approximates an airfoil shape that is provided in previously known fairings. The curvatures of the aft fairing top surface 94 shown in FIGS. 7 and 8 are exemplary. Alternative curvatures may be considered as factors such as complexity, weight, maintenance and cost are balanced with the aerodynamic requirements of a particular implementation.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. A Fuselage for an aircraft comprising a main landing gear cavity in a bottom wall of a fuselage of the aircraft, the main landing gear cavity comprising: a main landing gear cavity outer ring having an outer ring inner surface encircling the main landing gear cavity and being recessed within the fuselage from the bottom wall; a first baffle extending inward from the outer ring inner surface at a first baffle position that is aft and inboard on the outer ring inner surface; and a second baffle extending inward from the outer ring inner surface at a second baffle position that is aft and outboard on the outer ring inner surface.

2. The main landing gear cavity of claim 1, wherein the first baffle and the second baffle are connected to the outer ring inner surface.

3. The main landing gear cavity of claim 2, wherein the first baffle and the second baffle extend radially inward from the outer ring inner surface.

4. The main landing gear cavity of claim 2, wherein the first baffle extends forward and outboard from the outer ring inner surface, and the second baffle extends forward and inboard from the outer ring inner surface.

5. The main landing gear cavity of claim 2, wherein the first baffle and the second baffle extend forward from the outer ring inner surface.

6. The main landing gear cavity of claim 1, comprising an aft fairing disposed proximate an outer ring bottom edge of the main landing gear cavity outer ring and connected to the bottom wall of the fuselage at an aft side of the main landing gear cavity, the aft fairing having an aft fairing top surface with a top surface curvature causing the aft fairing top surface to extend downward away from the main landing gear cavity outer ring as the aft fairing top surface extends inward away from the main landing gear cavity outer ring.

7. The main landing gear cavity of claim 6, wherein the aft fairing has an aft fairing bottom surface with a bottom surface curvature causing the aft fairing bottom surface to extend upward toward the main landing gear cavity outer ring as the aft fairing bottom surface extends inward away from the main landing gear cavity outer ring.

8. The main landing gear cavity of claim 6, comprising a blade seal disposed proximate an outer ring top edge of the main landing gear cavity outer ring and extending inward such that a plurality of blades of the blade seal engage a tire tread of a main landing gear tire when a main landing gear of the aircraft is retracted into the main landing gear cavity.

9. The main landing gear cavity of claim 8, wherein the first baffle and the second baffle are disposed between the aft fairing and the blade seal.

10. A Fuselage for an aircraft comprising a main landing gear cavity in a bottom wall of a fuselage of the aircraft, the main landing gear cavity comprising: a main landing gear cavity outer ring recessed within the fuselage from the bottom wall, the main landing gear cavity outer ring having an outer ring inner an aft fairing disposed proximate the outer ring bottom edge of the main landing gear cavity outer ring and connected to the bottom wall of the fuselage at an aft side of the main landing gear cavity, the aft fairing having an aft fairing top surface with a top surface curvature causing the aft fairing top surface to extend downward away from the main landing gear cavity outer ring as the aft fairing top surface extends inward away from the main landing gear cavity outer ring.

11. The main landing gear cavity of claim 10, wherein the aft fairing has an aft fairing bottom surface with a bottom surface curvature causing the aft fairing bottom surface to extend upward toward the main landing gear cavity outer ring as the aft fairing bottom surface extends inward away from the main landing gear cavity outer ring.

12. The main landing gear cavity of claim 11, wherein the aft fairing top surface and the aft fairing bottom surface have a common radius of curvature defining the top surface curvature and the bottom surface curvature.

13. The main landing gear cavity of claim 10, comprising a forward fairing disposed proximate the outer ring bottom edge of the main landing gear cavity outer ring and connected to the bottom wall of the fuselage at a forward side of the main landing gear cavity, wherein the aft fairing and the forward fairing encircle the main landing gear cavity except for a main landing gear door gap that receives a main landing gear door when a main landing gear of the aircraft is retracted into the main landing gear cavity.

14. The main landing gear cavity of claim 10, wherein the aft fairing top surface has a radius of curvature and the top surface curvature is round.

15. The main landing gear cavity of claim 10, comprising:
 a first baffle extending inward from the outer ring inner surface at a first baffle position that is aft and inboard on the outer ring inner surface; and
 a second baffle extending inward from the outer ring inner surface at a second baffle position that is aft and outboard on the outer ring inner surface, wherein the first baffle and the second baffle are disposed above the aft fairing.

16. A Fuselage for an aircraft comprising a main landing gear cavity in a bottom wall of a fuselage of the aircraft, the main landing gear cavity comprising: a main landing gear cavity outer ring recessed within the fuselage from the bottom wall, the main landing gear cavity outer ring having an outer ring inner surface encircling the main landing gear cavity, an outer ring top edge and an outer ring bottom edge disposed opposite the outer ring top edge; an aft fairing disposed proximate the outer ring bottom edge of the main landing gear cavity outer ring and connected to the bottom wall of the fuselage at an aft side of the main landing gear cavity, the aft fairing having an aft fairing top surface with a top surface curvature causing the aft fairing top surface to extend downward away from the main landing gear cavity outer ring as the aft fairing top surface extends inward away from the main landing gear cavity outer ring; an inboard baffle extending inward from the outer ring inner surface at a first baffle position that is aft and inboard on the outer ring inner surface; an outboard baffle extending inward from the outer ring inner surface at a second baffle position that is aft and outboard on the outer ring inner surface, wherein the inboard baffle and the outboard baffle are disposed above the aft fairing; and a blade seal disposed proximate the outer ring top edge of the main landing gear cavity outer ring and extending inward such that a plurality of blades of the blade seal engage a tire tread of a main landing gear tire when a main landing gear of the aircraft is retracted into the main landing gear cavity.

17. The main landing gear cavity of claim 16, the inboard baffle and the outboard baffle are connected to the outer ring inner surface.

18. The main landing gear cavity of claim 16, wherein the inboard baffle and the outboard baffle extend radially inward from the outer ring inner surface.

19. The main landing gear cavity of claim 16, wherein the aft fairing top surface has a radius of curvature and the top surface curvature is round.

20. The main landing gear cavity of claim 16, wherein the aft fairing has an aft fairing bottom surface with a bottom surface curvature causing the aft fairing bottom surface to extend upward toward the main landing gear cavity outer ring as the aft fairing bottom surface extends inward away from the main landing gear cavity outer ring.

21. A method for reducing drag on an aircraft, comprising:
retracting main landing gear of the aircraft into a main landing gear cavity in a bottom wall of a fuselage of the aircraft during flight;
exposing the main landing gear and the main landing gear cavity to an airflow over the fuselage of the aircraft during flight; and
inhibiting unconstrained airflow circulating within the main landing gear cavity aft of the main landing gear when the landing gear is retracted with a plurality of baffles on an aft side of the main landing gear cavity.

22. The method for reducing drag of claim 21, wherein the plurality of baffles comprises an inboard baffle extending inward from a main landing gear cavity outer ring at an aft and inboard position on the main landing gear cavity outer ring, and an outboard baffle extending inward from the main landing gear cavity outer ring at an aft and outboard position on the main landing gear cavity outer ring, and wherein a first portion of the airflow circulating within the main landing gear cavity flows out of the main landing gear cavity on an inboard side of the inboard baffle, a second portion of the airflow circulating within the main landing gear cavity flows out of the main landing gear cavity on an outboard side of the outboard baffle, and third portion of the airflow circulating within the main landing gear cavity flows out of the main landing gear cavity between the inboard baffle and the outboard baffle.

23. The method for reducing drag of claim 22, wherein the inboard baffle and the outboard baffle extend radially inward from the main landing gear cavity outer ring.

24. The method for reducing drag of claim 22, wherein the inboard baffle and the outboard baffle extend forward from the main landing gear cavity outer ring.

25. The method for reducing drag of claim 21, wherein the main landing gear cavity includes an aft fairing disposed at the aft side of the main landing gear cavity, the aft fairing having an aft fairing top surface with a top surface curvature causing the aft fairing top surface to extend downward away from the main landing gear cavity as the aft fairing top surface extends inward away from the aft side of the main landing gear cavity, wherein the method comprises causing the airflow circulating within the main landing gear cavity aft of the main landing gear to flow over the aft fairing top surface and out of the main landing gear cavity.

26. The method for reducing drag of claim 25, wherein the aft fairing has an aft fairing bottom surface with a bottom surface curvature causing the aft fairing bottom surface to extend upward toward the main landing gear cavity as the aft fairing bottom surface extends inward away from aft side of the main landing gear cavity, wherein the method comprises causing the airflow circulating within the main landing gear cavity aft of the main landing gear to flow over the aft fairing bottom surface and out of the main landing gear cavity.

27. The method for reducing drag of claim 21, comprising engaging the main landing gear when the main landing gear is retracted into the main landing gear cavity to prevent most of the airflow circulating within the main landing gear cavity from passing into the fuselage.

\* \* \* \* \*